(12) United States Patent
Theeuwes

(10) Patent No.: US 8,493,184 B2
(45) Date of Patent: Jul. 23, 2013

(54) METHOD FOR REMOTE MEASURING OF A PHYSICAL VARIABLE

(75) Inventor: Johannes Adrianus Cornelis Theeuwes, Eindhoven (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 77 days.

(21) Appl. No.: 12/674,279

(22) PCT Filed: Aug. 22, 2008

(86) PCT No.: PCT/NL2008/050561
§ 371 (c)(1),
(2), (4) Date: Mar. 17, 2010

(87) PCT Pub. No.: WO2009/028936
PCT Pub. Date: Mar. 5, 2009

(65) Prior Publication Data
US 2011/0043334 A1 Feb. 24, 2011

(30) Foreign Application Priority Data
Aug. 24, 2007 (EP) .................................. 07114969

(51) Int. Cl.
*H04Q 5/22* (2006.01)
*G05B 11/01* (2006.01)
*G08B 21/00* (2006.01)
*G01V 3/00* (2006.01)
*G01N 27/02* (2006.01)
*G01L 21/30* (2006.01)
*G01R 31/10* (2006.01)

(52) U.S. Cl.
USPC ............... 340/10.1; 340/636.18; 340/10.4; 340/12.24; 324/460; 324/353; 324/441; 324/750.06

(58) Field of Classification Search
USPC .................................... 340/10.41; 73/146
See application file for complete search history.

(56) References Cited

U.S. PATENT DOCUMENTS

| | | | | |
|---|---|---|---|---|
| 6,617,963 B1 * | 9/2003 | Watters et al. | ............. | 340/10.41 |
| 6,950,009 B1 * | 9/2005 | Nysen | ......................... | 340/10.41 |
| 7,091,841 B2 * | 8/2006 | Adamson et al. | ............ | 340/447 |
| 2003/0146839 A1 * | 8/2003 | Ehlers et al. | ................ | 340/572.7 |
| 2004/0118197 A1 * | 6/2004 | Bulst et al. | ....................... | 73/146 |

FOREIGN PATENT DOCUMENTS
WO    WO 2006/108725 A1    10/2006

* cited by examiner

*Primary Examiner* — Jennifer Mehmood
*Assistant Examiner* — Pameshanand Mahase
(74) *Attorney, Agent, or Firm* — Dorsey & Whitney LLP

(57) ABSTRACT

System for remote measuring a physical variable comprising an RF transceiver arranged for transmitting an RF signal and for receiving a reflection signal derived from the transmitted signal. An RF transponder comprises a dielectric material having a dielectric property which is dependent on the physical variable according to a first function. The dielectric material is exposed to the physical variable to be measured. The transponder is arranged to receive the signal transmitted by the transceiver and to reflect a reflection signal, or the second and/or higher harmonics of it, which is dependent on the actual dielectric property. Processing means are provided for comparing the signal transmitted by the transceiver and the reflection signal received from the transponder and for converting the comparison result, e.g. the phase shift, into a value which is representative for the physical variable to be measured. The transponder may be e.g. a patch antenna.

12 Claims, 1 Drawing Sheet

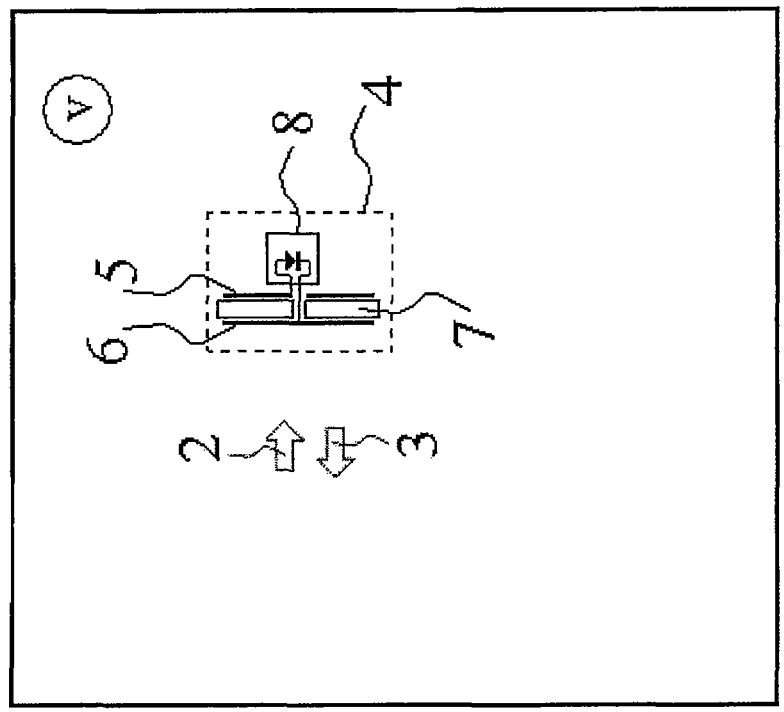
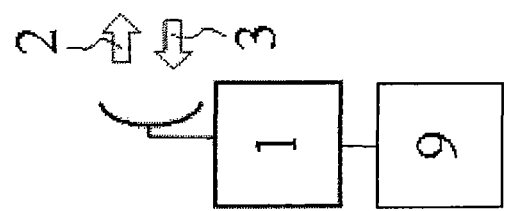

though, the transponder is arranged for receiving the signal transmitted by the transceiver and to reflect, as said reflection signal, a signal comprising higher harmonics of the transmitted signal.

METHOD FOR REMOTE MEASURING OF A PHYSICAL VARIABLE

CROSS-REFERENCE TO RELATED APPLICATIONS

This application is the national stage application of PCT Patent Application No. PCT/NL2008/050561, filed Aug. 22, 2008 and entitled "Method For Remote Measuring of a Physical Variable", and claims priority under 35 U.S.C. §365(b) to European Patent Application No. 07114969.4, filed Aug. 24, 2007 and entitled "Method For Remote Measuring a Physical Variable".

The present invention refers to a method for remote measuring a physical variable (v).

According to the invention it is preferred that the method comprises next steps:

providing an RF transceiver arranged for transmitting an RF signal and for receiving a reflection signal which is derived from said transmitted signal;

providing an RF transponder comprising a dielectric material having an dielectric property which is dependent on said physical variable according to a first function (f(v)) and which dielectric material is exposed to said physical variable v to be measured; the transponder being arranged to receive the signal transmitted by the transceiver and to reflect, as said reflection signal, a signal which is dependent on the signal transmitted by the transceiver and of the actual dielectric property according to a second function (f(d));

providing processing means for comparing the signal transmitted by the transceiver and the reflection signal received from the transponder and for converting the comparison result into a value which is representative for the physical variable (v) to be measured, applying said first function and second function (f(v), f(d)).

So, in short, the dielectric material of the transponder is exposed to the environment in which the physical variable to be measured—temperature, humidity, pressure etc.—is present, setting the dielectric constant. If the transceiver transmits its RF signal, the dielectric constant within the transponder may determine e.g. the magnitude, phase, etc. of the signal which is reflected by the transponder. At the side of the transmitter both, the transmitted and the reflected can be mutually compared and the value of the variable to be measured be calculated from the comparison result.

The attenuation of the reflection signal compared with the transmitted signal may be measured. A drawback could be that the attenuation depends on the distance and further transmission conditions between the transceiver and the transponder, which may be variable.

To prevent said drawback, it may be preferred that the (relative) phase shift is measured of the reflection signal compared with the signal transmitted by the transceiver. In most cases phase shift is independent on the (variable) distance and further transmission conditions between the transceiver and the transponder.

To be able to discriminate between signals which are not reflected by the transponder but by any other bodies, surfaces etc. and signals which are reflected by the transponder indeed, it is preferred that the transponder converts the signal received from the transceiver into a signal comprising second and/or higher harmonics and reflects that reflection signal comprising harmonics. In that case the harmonics have to be discriminated in the transceiver from any signals reflected by said other bodies, surfaces etc. which only will comprise the fundamental frequency (but no harmonics to a substantial extend) of the signal transmitted by the transceiver.

Below an exemplary embodiment of a system will be presented, illustrated. in FIG. 1.

FIG. 1 shows an exemplary embodiment of a system which is fit to perform the method as outlined in the foregoing.

In FIG. 1 the system for remote measuring a physical variable v, e.g. a temperature or humidity within a certain room or area comprises an RF transceiver 1 arranged for transmitting an RF signal 2 and for receiving a reflection signal 3 which is derived from said transmitted signal 2. The system, moreover, includes an RF transponder 4 comprising e.g. a patch antenna which is includes two flat antenna conductors 5, 6 having a layer 7 of a dielectric material in between them, having an dielectric property which is dependent on said physical variable according to a first function d=f(v). The dielectric material (which may reside inside or outside the proper transponder) is exposed to said physical variable v to be measured.

As a dielectric material a FR-4 like material may be used. FR-4 (Flame Resistant 4), is a type of material used for making a printed circuit board (PCB). The FR-4 used in PCBs is typically UV stabilized with a tetra functional resin system. It is typically a yellowish colour. FR-4 manufactured strictly as an insulator (without copper cladding) is typically a difunctional resin system and a greenish colour. FR-4 is similar to an older material called G-10. G-10 lacked FR-4's self extinguishing flammability characteristics. FR-4 has widely replaced G-10 in most applications. Some military applications where destruction of the circuitboard is a desirable trait will still utilize G-10 (Source: http://en.wikipedia.org/wiki/FR-4)

The transponder 4 is arranged to receive the signal 2 transmitted by the transceiver and to reflect, as reflection signal 3, a signal. The amplitude, phase etc. of the reflection signal of course depends on the properties (amplitude, frequency etc.) of the incoming signal 2 transmitted by the transceiver and, moreover, on the properties of a circuit 8, which comprises a diode or diode-like component, providing—as generally known in the art—higher (especially second) harmonics in the reflected signal, which harmonics can be discriminated, at the transceiver side, from accidental signal reflections. The dependency of the reflection signal could be represented by 3=f(d,2)).

At the side of the transceiver processing means 9 are provided for comparing the properties of signal 2 transmitted by the transceiver 1 and the reflection signal 3 received back from the transponder, and for converting the comparison result into a value which is representative for the physical variable v to be measured, applying the dependency functions f(v) and f(d)).

As is has been mentioned and discussed in the foregoing, the processing means 9 preferably are arranged to measure the phase shift of the reflection signal compared with the signal transmitted by the transceiver. For resonant signals the antenna, mainly formed by the members 5, 6 and 7, will reflect a phase shifted reflection signal. As the resonance frequency depends on the actual dielectric constant of the substrate 7, the actual phase shift thus will depend on the dielectric constant of the substrate 7 and will therefore depend on the actual physical properties (e.g. temperature, humidity, pressure etc.) of the antenna's environment, indicated in FIG. 1 by the symbol v.

As mentioned before, it is preferred the transponder to comprise means for converting the signal received from the transceiver into second and/or higher harmonics of that signal and for reflecting at least part of those harmonics. In that case the transceiver must comprise means (e.g. a filter) for discriminating the harmonics from the fundamental frequency of the signal transmitted by the transceiver. For the generation of such second and/or higher harmonics the transponder circuitry 8 may comprise a diode or another non-linear member.

The antenna of the transponder 4 may have the shape of a micro strip antenna, a printed antenna, a micro strip patch antenna or a patch antenna.

The invention claimed is:

1. A method for remote measuring a physical variable comprising
    transmitting an RF signal, by an RF transceiver, to an RF transponder comprising a dielectric material having a dielectric property which is dependent on said physical variable according to a first function and which dielectric material is exposed to said physical variable to be measured, wherein the dielectric property varies with variations in the physical variable as a result of direct exposure to an environment defining the physical variable, the transponder being arranged to receive the signal transmitted by the transceiver;
    receiving a reflection signal, by the RF transceiver, that is reflected from the RF transponder, said reflection signal being a signal which is dependent on the signal transmitted by the transceiver and on the actual dielectric property according to a second function;
    comparing, by a processing means, the signal transmitted by the transceiver and the reflection signal received from the transponder; and
    converting, by the processing means, the comparison result into a value which is representative for the physical variable to be measured by applying said first function and second function.

2. The method according to claim 1, wherein the operation of comparing the signal transmitted by the transceiver and the reflection signal received from the transponder includes comparing an attenuation of the reflection signal with the signal transmitted by the transceiver to determine an attenuation that occurred when the signal transmitted by the transceiver passed through the dielectric material, wherein the attenuation varies as the dielectric property varies with variations in the physical variable as a result of direct exposure to an environment defining the physical variable.

3. The method according to claim 1, wherein the operation of comparing the signal transmitted by the transceiver and the reflection signal received from the transponder includes comparing a phase of the reflection signal with a phase of the signal transmitted by the transceiver to determine a phase shift that occurred when the signal transmitted by the transceiver passed through the dielectric material, wherein the phase shift varies as the dielectric property varies with variations in the physical variable as a result of direct exposure to an environment defining the physical variable.

4. The method according to claim 1, 2, or 3, wherein the transponder converts the signal received from the transceiver into second and/or higher harmonics and reflects said reflection signal comprising said harmonics;
    wherein in said transceiver the harmonics are discriminated from the fundamental frequency of the signal transmitted by the transceiver.

5. A system for remote measuring a physical variable comprising
    an RF transceiver arranged for transmitting an RF signal and for receiving a reflection signal which is derived from said transmitted signal;
    an RF transponder comprising a dielectric material having an dielectric property which is dependent on said physical variable according to a first function and which dielectric material, in operation, is exposed to said physical variable to be measured; wherein the dielectric property varies with variations in the physical variable as a result of direct exposure to an environment of the physical variable, the transponder being arranged to receive the signal transmitted by the transceiver and to reflect, as said reflection signal, a signal which is dependent on the signal transmitted by the transceiver and of the actual dielectric property according to a second function; and
    a processor for comparing the signal transmitted by the transceiver and the reflection signal received from the transponder and for converting the comparison result into a value which is representative of the physical variable to be measured by applying said first function and second function.

6. The system according to claim 5, wherein the processor is arranged to compare the phase of the reflection signal with the phase of the signal transmitted by the transceiver to determine a phase shift that occurred when the signal transmitted by the transceiver passed through the dielectric material, wherein the phase shift varies as the dielectric property varies with variations in the physical variable as a result of direct exposure to an environment defining the physical variable.

7. The system according to claim 5 or 6, wherein the transponder is configured to convert the signal received from the transceiver into second and/or higher harmonics of that signal and for reflecting at least part of those harmonics; wherein said transceiver is configured to discriminate the harmonics from the fundamental frequency of the signal transmitted by the transceiver.

8. The system according to claim 7, wherein the transponder comprises at least two reflecting antenna electrodes interconnected via an interconnection circuit comprising a diode.

9. The system according to claim 5, wherein the transponder comprises at least two reflecting antenna electrodes having the shape of a micro strip antenna, a printed antenna, a micro strip patch antenna or a patch antenna.

10. The system of claim 5, wherein the transponder comprises at least two reflecting antenna electrodes and the dielectric material is positioned between the at least two reflecting antenna.

11. A method for remote measuring of a physical variable comprising
    receiving an RF signal at an RF transponder comprising a dielectric material having a dielectric property which is dependent on said physical variable according to a first function and which dielectric material is exposed to said physical variable to be measured, wherein the dielectric property varies with variations in the physical variable as a result of direct exposure to an environment defining the physical variable, the transponder being arranged to receive the signal transmitted by an RF transceiver; and
    reflecting a reflection signal from the RF transponder, said reflection signal being a signal which is dependent on the signal transmitted by the transceiver and on the actual dielectric property according to a second function.

12. The method according to claim 11, further comprising converting the signal received from the transceiver into second and/or higher harmonics; and
    reflecting said reflection signal comprising said harmonics.

* * * * *